Patented June 10, 1930

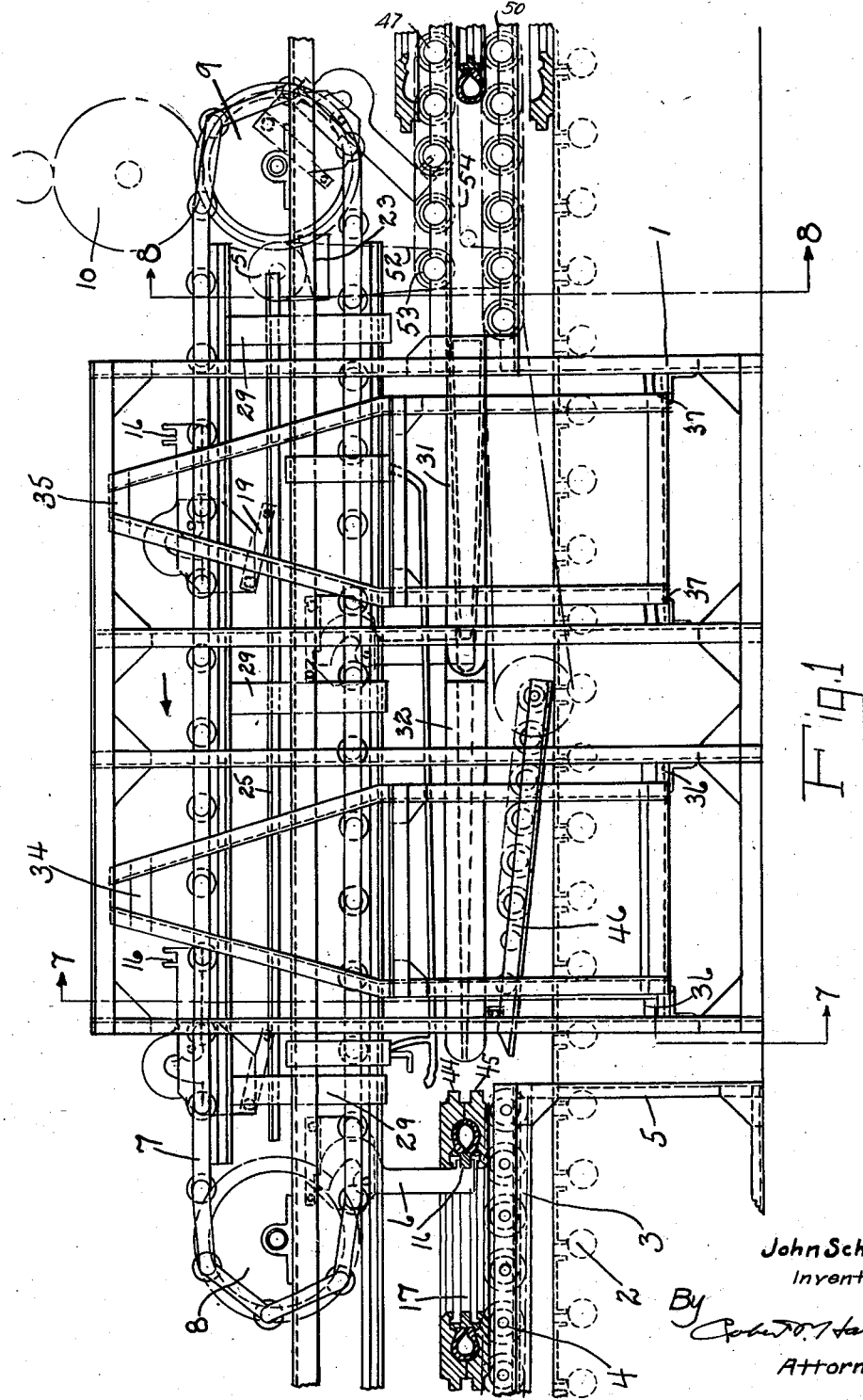

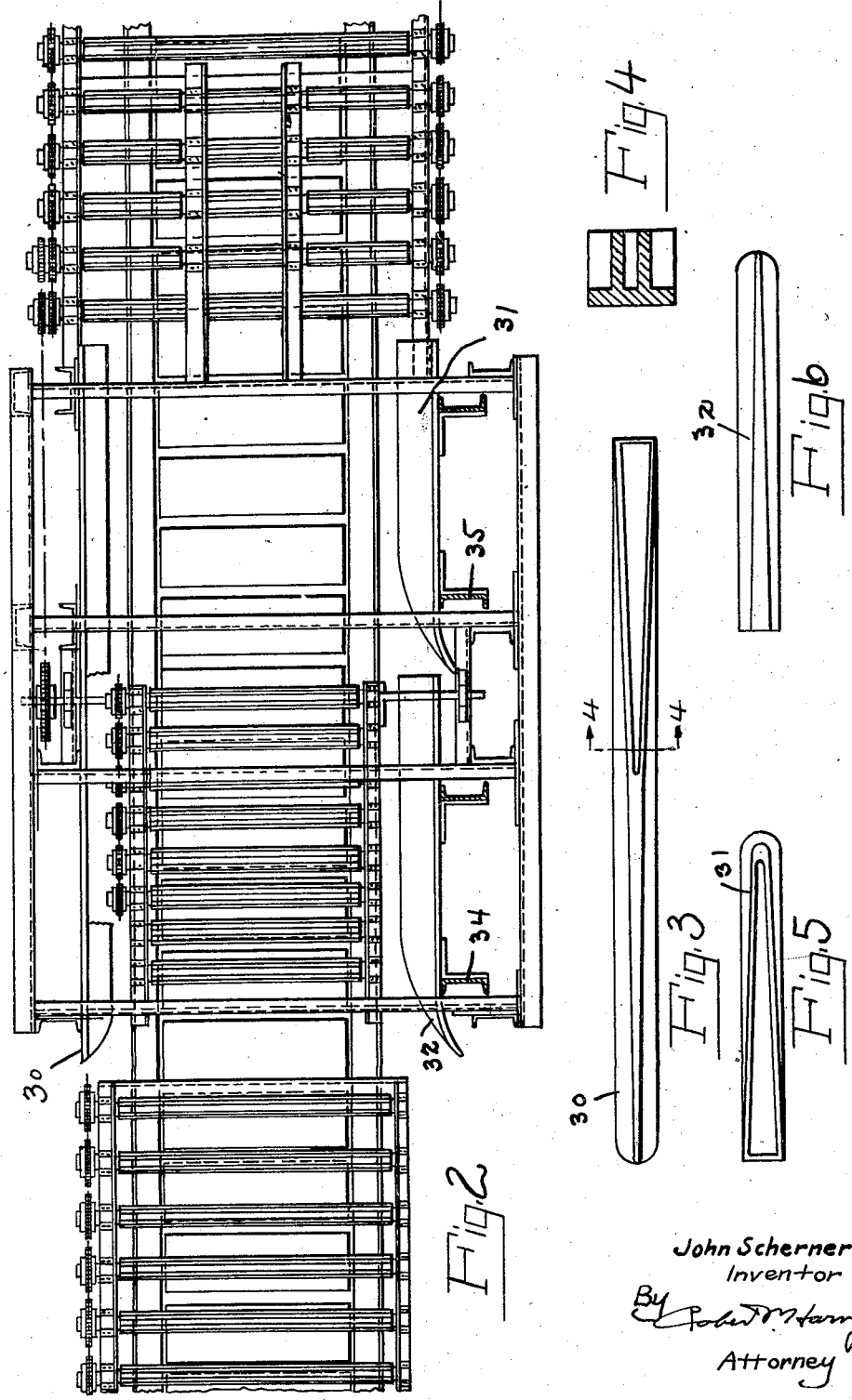

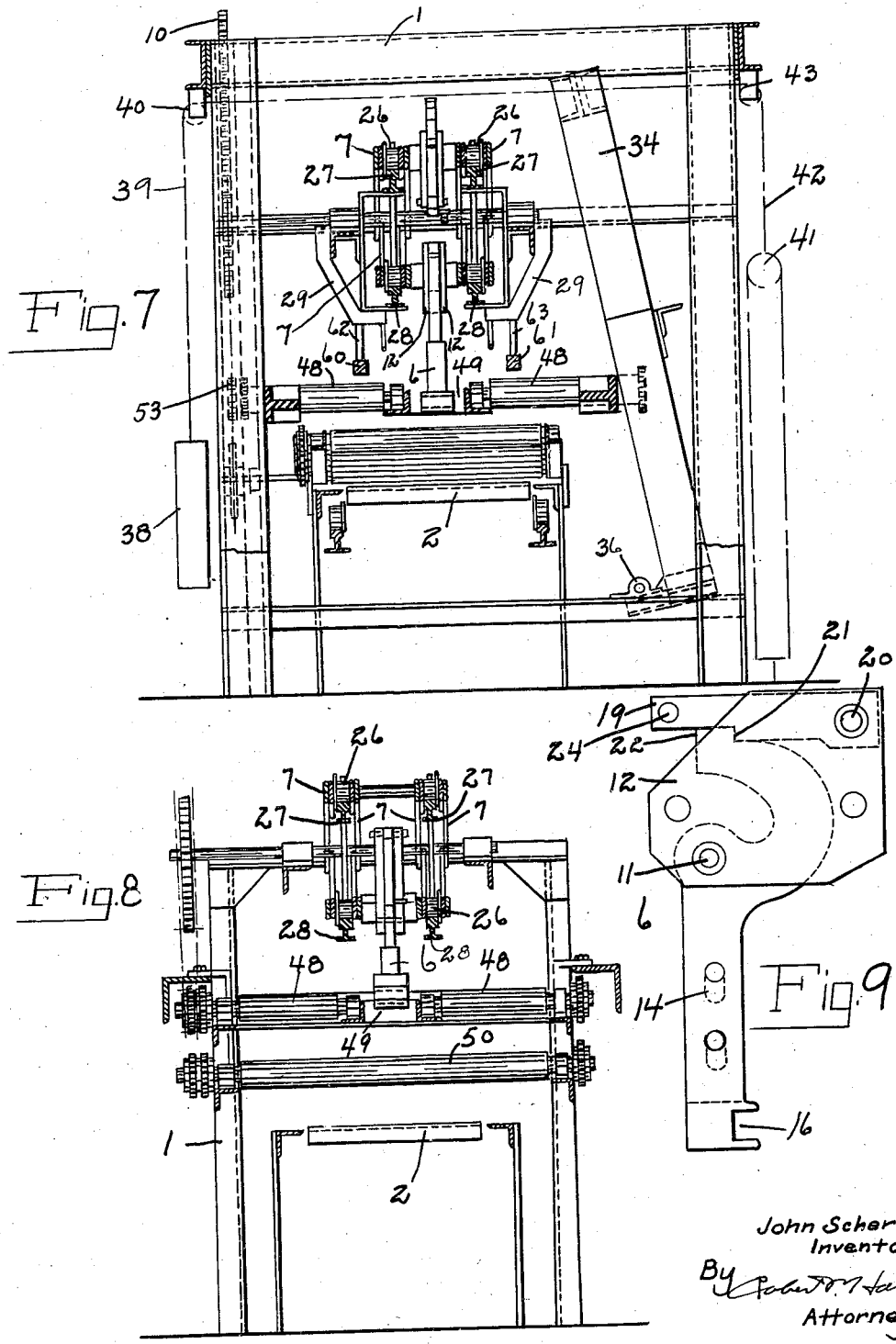

1,762,836

UNITED STATES PATENT OFFICE

JOHN SCHERNER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

MOLD BREAKER

Application filed November 17, 1926. Serial No. 148,938.

My invention relates to the vulcanization of pneumatic tire casings and more particularly to means for opening the molds and removing the cured casings. Among its objects is to provide a device which may be used in connection with mold conveyor systems now in use and to provide a device in which the mold halves when separated are in position for handling by the equipment usually associated with present conveying systems. A further object is to provide a device continuous in operation and adaptable to continuous conveying systems. Other and further objects will be apparent from the following specification and claims.

In the accompanying drawings which illustrate one embodiment of the invention—

Figure 1 is a side elevation of the device, showing the molds in section,

Figure 2 is a plan view with the overhead conveyor and a portion of the frame removed, Figure 3 is a detail of the stationary mold opening wedge, Figure 4 is a section on line 4—4 of Figure 3, Figures 5 and 6 are details of the adjustable wedges, Figure 7 is a section substantially on the line 7—7 of Figure 1, Figure 8 is a section substantially on line 8—8 of Figure 1, and Figure 9 is a detail of one of the conveyor hooks.

Referring to the drawings 1 designates the main frame of the device said frame being generally rectangular in shape and adapted to bridge a conveyor indicated at 2 which latter forms part of the general conveyor system for handling molds and in itself forms no part of the invention. I preferably provide an auxiliary conveyor indicated in Figure 1 at 3 for elevating the incoming molds above the conveyor 2. This auxiliary conveyor may be of any suitable form and as shown comprises a set of suitably driven rolls 4, supported upon a framework 5. When in proper position on the auxiliary conveyor 3 the molds are engaged by hooks 6 carried on overhead sprocket chains 7 engaging sprockets 8 and 9, supported from the main frame 1, driven by a suitable gear chain 10 from a motor or other source of power not shown. As best shown in Figures 1 and 9 the hooks 6 are pivoted at 11 to plates 12 suitably secured to the chain 7. The length of these hooks is preferably made adjustable as indicated at 14 in Figure 9, to accommodate varying sizes of molds. The hooks are provided at their free end with recesses 16 adapted to engage the inner circumference of the bead rings 17 and to draw the mold to the opening devices later described. The hook is held in operative position by latch 19 pivoted at 20 between plates 12 provided with a shoulder 21 adapted to engage lug 22 formed integral with hook 6. In normal positon as shown in Figure 9 shoulder 21 prevents hook 6 from rearward movement about its pivot 11. After the mold has been carried through the opening devices, it is desirable to release hooks 6 to permit disengagement of the recess 16 from the bead ring 17 and this is accomplished by means of a cam member 23 (Fig. 1) secured to the frame 1 and adapted to engage a pin 24 projecting from latch 19 to raise the latter and disengage shoulder 21 and lug 22 permitting hooks 6 to swing rearwardly under the action of gravity as shown on the right in said figure. As the hooks move upwardly around sprocket 9 they swing about pivot 11 to a horizontal position as shown in Figure 1, pin 24 of latch 19 sliding along a guide rail 25. As the hooks round the sprocket 8 they fall to a vertical position, latch 19 dropping into position to lock the hook in operative position. The links of chains 7 are provided with rollers 26 (see Figures 7 and 8) adapted to run on upper and lower rails 27 and 28 supported by hangers 29 from the frame of the machine. The devices for opening the molds comprise a fixed wedge member 30 secured to frame 1 and wedge members 31 and 32 secured respectively to A frames 34 and 35 pivoted at 36 and 37 to frame 1. As indicated in Figure 7 the A frames are urged inwardly as by a weight 38 secured to a cable 39 running over pulley 40 and secured to the top of the A frame. The inward limit of movement of the A frames is made adjustable as by means of pulley block 100

41 secured to cable 42 running over pulley 43 and secured to the A frame. It will be understood that any suitable means for yieldingly securing the A frames in adjusted position may be substituted for the weights 38 and pulleys 41. The object of mounting wedges 31 and 32 on these yieldable A frames is to accommodate the device to slight variations in the diameters of the molds of a given size and permit adjustment for varying sized molds. Wedges 31 and 32 could be combined into a single wedge similar to 30 but in the interests of speed of operation it is desirable that the spacing of hooks 6 on chain 7 should be such that 2 molds may be in the device simultaneously and to accommodate the slight variation in diameter which may exist between the two molds simultaneously in the machine the separation of one of the opening wedges into two parts is desirable. As is apparent from Figures 5 and 6 wedge 32 forms a continuation of wedge 31 and the two combined are substantially similar to wedge 30.

In order to maintain the molds in proper relation with hooks 6 it is found desirable to provide rails 60 and 61 adapted to engage the top of the molds as the latter engage the wedges. These rails are yieldably mounted as at 62 and 63 to the hangers 29, (see Figure 7).

Referring to Figure 1, as the mold is advanced into the device by hooks 6 the points of wedges 30 and 32 engage between lugs 44 and 45 formed respectively on the upper and lower halves of the mold. The pitch of one of the wedges is made slightly steeper than the other in order that the mold may be broken open at one side in advance of the other. As the mold halves separate the lower half falls upon an incline conveyor 46 which carries it to conveyor 2. The upper mold half still in engagement with hooks 6 rides up the incline of the wedges and onto a conveyor 47 which is formed of short rolls 48 the short rolls providing a space 49 through which hooks 6 extend. The casing, the bead rings of which are still in engagement with recess 16 of the hooks, is carried thereby onto a conveyor 50 whereupon latch 19 is operated as previously described to release the hook. Conveyors 47 and 50 are preferably driven from the gear chain 10 as by sprocket 51 and sprocket chain 52 the latter engaging a sprocket 53 mounted on the shaft of one of the rolls of conveyor 47. All of the rolls of conveyors 47 and 50 are driven by a sprocket chain 54 engaging sprockets carried by the individual rolls of the conveyor.

I claim:

1. A device of the character described comprising means for advancing a loaded tire mold and relatively stationary means located in the path of the advancing mold to separate the mold halves from the tire, said mold separating means being adjustable to receive varying sizes of molds.

2. A device of the character described comprising means for advancing a loaded tire mold, means adapted to engage between the halves of the mold to separate the mold halves as the mold is advanced and means to maintain the tire in an intermediate spaced position relative to the mold halves during the separation of the mold halves.

3. A device of the character described comprising means for advancing a loaded tire mold, relatively stationary wedge means adapted to engage between the halves of the mold to separate the mold halves as the mold is advanced and means to separate the tire from the mold halves.

4. A device of the character described comprising means for advancing a loaded tire mold, wedge means adapted to engage between the halves of the mold to separate the mold halves as the mold is advanced, and means associated with the advancing means to advance the tire in an intermediate position relative to the mold halves during the separation of the mold halves.

5. A device of the character described comprising means adapted to engage the inner periphery of a loaded tire mold to advance the latter along a predetermined path, a recess formed on the advancing means adapted to engage the flange of the tire bead ring and wedge means adapted to engage between the halves of the mold to separate the mold halves as the mold is advanced.

6. A device of the character described comprising means to engage the inner periphery of a loaded tire mold to advance the latter along a predetermined path a recess formed on the advancing means adapted to engage the flange of the tire bead ring, wedge means adapted to engage between the halves of the mold to separate the mold halves as the mold is advanced and means to disengage said recess from the flange of the bead ring at a predetermined point in its path of travel.

7. A device of the character described comprising a series of pivoted hooks adapted to engage the inner peripheries of loaded tire molds to advance the latter along a predetermined path, means for locking the hooks against movement about their pivots, recesses formed in the ends of said hooks adapted to engage the flanges of the tire bead rings, wedge means adapted to engage between the halves of the molds to separate the mold halves as the molds are advanced and means positioned in the path of travel of the hooks to release the latter for pivoted movement to thereby disengage said recesses from the flanges of the bead rings.

8. A device of the character described adapted to be associated with a mold conveying system comprising means for advancing a loaded tire mold, means adapted to engage between the halves of the mold to separate the mold halves as the mold is advanced, means to maintain the tire in an intermediate position relative to the mold halves during the separation of the mold halves, an inclined conveyor adapted to carry the lower half of the mold to the mold conveying system and means to present the upper half of the mold in position to be engaged by the instrumentalities of said systems.

9. A device of the character described comprising means for advancing a loaded tire mold, and a plurality of relatively stationary wedges mounted on either side of the path of travel of the loaded mold and positioned to engage between the edges of the mold halves to separate the latter from the tire, the distance between the wedges being automatically variable to accommodate varying sizes of molds.

10. A device of the character described comprising means for advancing a loaded tire mold along a predetermined path, and a plurality of pairs of opposed wedge members positioned along the path of travel of the loaded mold, at least one of each pair of the opposed wedges being yieldingly mounted, said wedges being positioned to engage between the edges of the mold halves to separate the latter from the tire.

11. A device of the character described comprising means for advancing a loaded tire mold along a predetermined path, a plurality of pairs of opposed wedge members positioned along the path of travel of the loaded mold, at least one wedge of each pair of opposed wedges being yieldingly mounted, said wedges being positioned to engage between the edges of the mold halves to separate the latter from the tire and means to adjust the normal spacing of the wedges.

In testimony whereof I have signed my name to the above specification.

JOHN SCHERNER.